No. 778,123. PATENTED DEC. 20, 1904.
W. FETZER.
GANG PRESS WHEEL.
APPLICATION FILED NOV. 16, 1903.
NO MODEL.
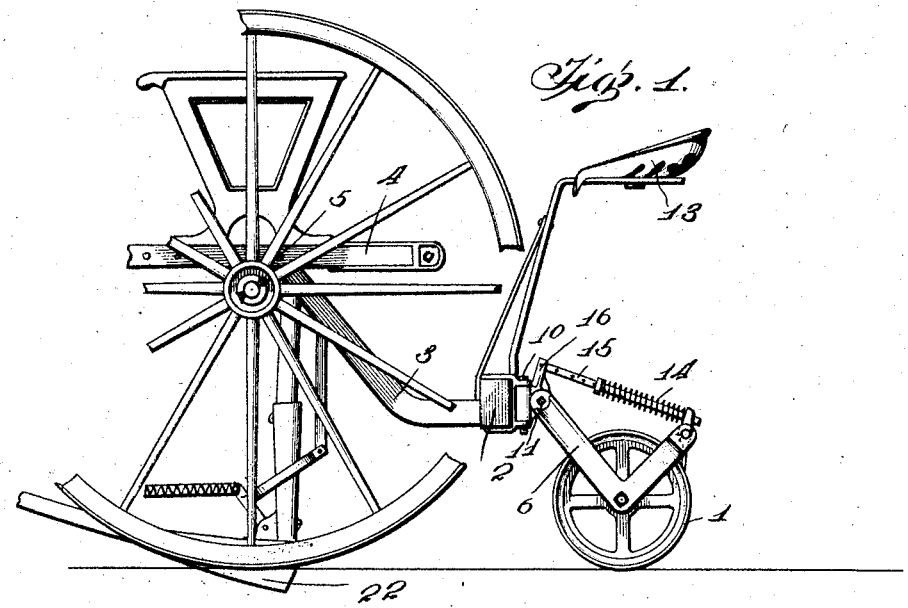
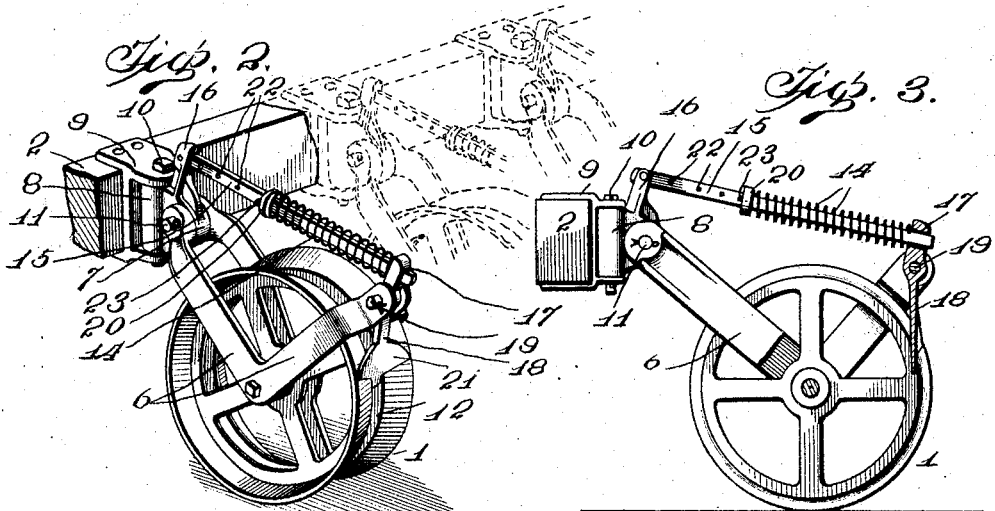
Witnesses
Inventor
William Fetzer
By Mason, Fenwick & Lawrence
Attorneys No. 778,123. Patented December 20, 1904.

UNITED STATES PATENT OFFICE.

WILLIAM FETZER, OF MIDDLETOWN, OHIO.

GANG PRESS-WHEEL.

SPECIFICATION forming part of Letters Patent No. 778,123, dated December 20, 1904.

Application filed November 16, 1903. Serial No. 181,398.

*To all whom it may concern:*

Be it known that I, WILLIAM FETZER, a citizen of the United States, residing at Middletown, in the county of Butler and State of Ohio, have invented certain new and useful Improvements in Gang Press-Wheels; and I do hereby declare the following to be a full, clear, and exact description of the invention, such as will enable others skilled in the art to which it appertains to make and use the same.

This invention relates to improvements in press-wheels for grain-drills or other seeding devices, and is particularly adapted for use in connection with drills carried upon high wheels, the press-wheels being pivotally secured to the frame of such drills.

The invention comprises a press-wheel individually pivoted conveniently to a gang-wheel bar and means for holding said wheel in constant contact with the ground.

The invention also comprehends an improvement in gang press-wheels comprising means for pivotally securing the wheel to a drill-frame, the said wheel being provided with a central slot or groove.

It also comprehends a gang press-wheel comprising a wheel proper, a swiveled head for carrying the wheel, a wheel-frame pivoted to said head, and spring-actuated means for supporting a weight yieldingly upon said gang-wheel.

It also consists in certain other novel constructions, combinations, and arrangements of parts, as will be hereinafter fully described and claimed.

In the accompanying drawings, Figure 1 is a side elevation of a portion of a grain-drill, showing my improved gang press-wheel applied thereto. Fig. 2 is a detail perspective view of one of the press-wheels, showing the manner of mounting the same upon the bar or beam which carries the said press-wheels. Fig. 3 is a detail view, partially in elevation and partially in section, showing the manner of engagement between the spring-actuated bar and the scraper of the wheel.

The present invention is primarily designed with a view of providing a seed-press device which can be applied to ordinary grain-drill machines which are usually conveyed upon high wheels some distance from the ground. The gang press-wheel forming the subject-matter of this invention is also intended to receive and utilize the weight of the operator of the drill or other machine, the said weight being supported by the covering or press wheels so as to pulverize and pack the ground over the seed-furrows somewhat in the manner of a field-roller.

The gang press-wheel 1 illustrated in the accompanying drawings is carried, with others, by a beam 2, arranged transversely of the machine to which it is attached and extending from a point near one wheel of the drill to a point near the other. The beam 2 is provided with end-supporting links or arms 3, which extend from the ends of said bar upwardly to the frame 4 of the drill, to which said links 3 are pivoted, as at 5. In this manner the bar or beam 2 may rise and fall with respect to the frame of the drill. The proper height of the beam 2 is maintained by the gang press-wheels, which are pivoted thereto. Each of the wheels 1 is usually provided with a wheel-frame 6, as shown in the drawings. I preferably form this frame of two members—one upon each side—the forward ends of the members being bent toward each other and having a bearing upon the rear projection 7 of the swivel-head 8. The swivel-head or knuckle 8 is pivoted in a bracket 9, which is rigidly fastened to the beam 2 by bolts or rivets or in any other desired manner. The bracket 9 is provided with rearwardly-extending upper and lower lugs, which receive the knuckle 8 between them. The knuckle 8 is arranged in a vertical plane and is formed with a vertical bearing extending through it, and a pivot-bolt, as 10, is passed downwardly through the bracket 9 and the bearing in the said knuckle. The knuckle is thus free to swing about the vertical pin 10. It will be apparent, of course, that the pin 10 might not be arranged exactly in a vertical plane, but could be set at an angle to the beam without departing in the least from the spirit of the invention. The forward ends of the side wheel-frames are pivotally secured to the projection 7 by a pivot-bolt 11, which passes horizontally through the said projection and the ends of the wheel-frame.

The wheel proper, 1, is preferably formed with a concaved peripheral surface, and while the said wheel may be made with a solid rim I prefer to form it with two sections arranged upon either side of a central opening 12. The wheel 1 may be formed of two members secured to its hub, or the rim of the wheel may be merely slotted centrally, all within the spirit of the present invention. By the structures mentioned the wheel is provided with two concaved pressing-surfaces upon each side of the central slot, as clearly illustrated in Fig. 2, and as the wheel follows a seed-furrow it presses and pulverizes the ground thoroughly upon each side of the seed, but does not press directly over the seed. The concaved side portions of the wheel-rim are, however, sufficiently near together to firmly press the soil about the seed after they have been deposited in the ground.

The gang press-wheels of the present invention are designed to support the weight of the operator of the drill, and for this purpose the operator's seat 13 is supported, by means of suitable standards, directly by the beam 2, to which it is secured. In order to support the beam beneath the weight of the operator by a yielding pressure, a spring 14 is provided for each press-wheel, the spring being carried by a guide-bar 15. The bar 15 is pivoted at its inner end to a standard 16, projecting upwardly from the knuckle 8. The other end of the bar extends backwardly from the press-wheel and is movably supported at its rear end by the rear end of the wheel-frame 6. As shown in the drawings, the bar 15 may extend through a slot 17, formed in the upper end of a scraper 18. The scraper 18 is pivoted at 19 between the rear ends of the wheel-frame members 6 and engages at its lower end the periphery of the press-wheel, so as to prevent the collection of soil thereon. The spring 14 abuts at one end against a collar 20, adjustably secured to the bar 15, while at the other end it rests against the upper end of the scraper 18. The spring thus has a tendency to hold the scraper 18 constantly against the periphery of the wheel 1. The weight of the operator upon the beam 2 tends to depress the beam, which in turn tends to force the knuckle 8 downwardly with respect to the press-wheel. This motion is accommodated by the spring 14, which is interposed between the collar 20 and the rear end of the wheel-frame. The wheel-engaging end 21 of the scraper is made of sufficient breadth to engage both portions of the press-wheel and is curved slightly to fit the concaved surfaces of said portions. A portion of the scraper is permitted to extend into the slot between the wheel portions for clearing the same at all times and also for guiding the scraper in its engagement with the surface of the wheel.

The tension of the spring 14 may be varied by adjusting the position of the collar 20 upon the bar 15, and this is effected by the providing of the said bar with a number of apertures 22, which may be engaged by a pin 23. The collar 20 is forced against the pin by the action of the spring 14. The bar 15 is free to move through the slot 17, and the individual press-wheels of the gang can thus accommodate themselves to any unevenness of the ground or can rise to pass over rocks, stumps, or other obstructions.

The pivotal relation of the wheel-frame to the bar 15 is such that when the frame occupies an elevated position with respect to the ground the outer end thereof will be brought closer to the pivot-point of the bar 15 and will tend to compress the spring 14. The weight of the beam 2 thus rests upon the wheel-frames through the agency of the springs 14. It will be apparent that the movable connection between the bar 15 and the outer end of the wheel-frame may be effected without the interposition of the scraper 18, it merely being necessary to provide a guiding means upon the frame for the said bar and an abutting means for the end of the spring 14. It will also be evident that the mechanism may be varied in other minor details of construction without departing from the scope of the present invention.

There may be any number of press-wheels secured to the beam 2, and they are arranged so as to be in proper alinement with the furrow-openers 22, carried by the drill. The swivel or knuckle connection between the wheel-frames and the beam 2 permits the press-wheels to follow the drill in all of its movements without difficulty.

Having thus fully described my invention, what I claim as new, and desire to secure by Letters Patent, is—

1. In a press mechanism and in combination with a support, of a frame pivoted to the support for vertical swinging movement, a projecting part on the frame extending laterally beyond the same, a part carried by the support, a spring interposed between the last-mentioned part and the laterally-projecting part, and a wheel carried by the frame.

2. In a press mechanism and in combination with a support, of a frame pivoted to the support for vertical swinging movement, a projecting part on the frame extending upwardly beyond the same, a part carried by the support, a spring interposed between the last-mentioned part and the upwardly-projecting part, and a wheel carried by the frame.

3. In a press device, the combination with a supporting member, of a frame pivotally secured thereto for vertical movement, of a wheel mounted in the frame, an offset part on the supporting member, a part offset in relation to and connected with the frame, and a spring interposed between the offset parts adapted to resist the vertical movement of the frame.

4. A press mechanism for drills comprising individual press-wheels, each of said wheels operating upon a single furrow only, an individual frame for each of said press-wheels, the said frame projecting beyond the press-wheel in each direction, means for supporting one end of each frame and tension means interposed between said supporting means and the outer end of each frame.

5. In a seed-planting machine, the combination with a frame, of press-wheels supporting said frame, means for pivotally mounting the press-wheels, a scraper for the respective wheels, and a tension mechanism interposed between the scraper and the frame.

6. A press mechanism for drills comprising a supporting-beam, arms projecting therefrom, single press-wheels carried by each arm, each of said press-wheels having two inclined rim portions for engaging the opposite sides of a single furrow, tension means for each press-wheel, a support for a rider carried by said beam, the action of the beam being to distribute the weight of the rider evenly upon the individual press-wheels.

7. In a seed-planting machine, the combination with a frame, of a press-wheel connected with the frame and having an independent vertical movement, a scraper for the wheel, and a tension mechanism connected with the scraper for resisting the vertical movement of the wheel.

8. A gang press mechanism comprising a number of individual press-wheels, each wheel engaging a single furrow, a knuckle pivotally secured to said beam for each of said press-wheels, a pivoted frame carried by each knuckle supporting the press-wheel, an arm projecting forwardly from said knuckle, and tension means interposed between each arm and the outer end of each frame for forcing the said press-wheels downwardly.

9. A press mechanism for drills comprising a wheel, a supporting swiveled knuckle, a wheel-frame pivoted to said knuckle, and a spring interposed between the knuckle and the outer end of the frame for maintaining a pressure upon the same.

10. A gang press mechanism for drills comprising a beam, pivoted knuckles carried by said beam, wheel-frames pivoted to said knuckles, wheels mounted in the said frames and springs interposed between the knuckles and the outer ends of the frames for holding them down.

11. A press mechanism for drills comprising a seat-supporting beam, a series of knuckles pivoted to the beam, a series of wheel-frames pivoted each to a knuckle, press-wheels carried thereby, and compression means interposed between the knuckles and the outer ends of the wheel-frames for distributing the weight of the operator occupying the seat upon the wheels.

12. A press mechanism for drills comprising a wheel, a frame carrying the same, a knuckle for pivotally holding the wheel-frame, a standard projecting upwardly from the knuckle, a slotted projection carried by the wheel-frame, a bar pivoted to the standard and extending through the frame-slot, and a spring carried by the bar for pressing the parts away from the said standard.

13. A press mechanism for drills comprising a supporting-knuckle, a standard projecting therefrom, a wheel-frame pivoted to the knuckle, a wheel carried by the frame, a scraper pivoted to the wheel-frame and formed with a guide-slot, a bar pivoted to the standard at one end and extending at its other end through a slot in the scraper, and a spring surrounding the bar and tending to press the scraper away from the said standard.

14. A press mechanism for drills comprising a knuckle, a wheel-frame pivoted thereto, a wheel carried by the frame, a bar pivotally connected with the knuckle and extending to the outer end of the wheel-frame, guiding means carried by the said frame for holding the outer end of the bar movably in position, an adjustable abutment carried by the bar and a spring interposed between the abutment and the guiding means on the wheel-frame.

15. A gang press mechanism for drills comprising a suitable support, press-wheels connected therewith, a plurality of frames pivotally secured to said support and holding the wheels movably in place, the said frames projecting beyond the wheels on each side thereof, and a tension means interposed between the outer free end of each of said frames and their supports.

16. A gang press mechanism for grain-drills comprising a support, press-wheels secured thereto, a series of curved frames each carrying a press-wheel and connecting it with the said support, the said frames projecting at their ends beyond the wheels, and cushioning means interposed between the said support and the outer end of each of said curved frames.

17. A gang press mechanism for drills comprising a press-wheel, a wheel-frame carrying the said wheel and projecting at each end beyond the wheel, a knuckle pivotally engaging one end of said frame, and a cushioning means interposed between the other end of the frame and the said knuckle for maintaining a pressure upon said wheel.

18. A gang press mechanism for grain-drills comprising a beam, a series of pivoted knuckles carried by the said beam, wheels secured to each knuckle, a wheel-frame carrying each wheel and projecting at its ends beyond the periphery thereof, one end of said wheel-frame being connected with its knuckle, and flexible means interposed between the other end of the wheel-frame and the said knuckle for exerting a downward pressure upon the frame and the wheel.

19. A pressure mechanism for drills comprising a beam, a series of swiveled knuckles carried thereby, press-wheels connected with the said beam, a series of frames one for each wheel, the ends of each frame projecting in opposite directions beyond the periphery of the wheel one end of said frame being pivotally connected with its respective knuckle, and a spring interposed between the other end of each frame and its knuckle for maintaining a downward pressure upon the wheel.

In testimony whereof I hereunto affix my signature in presence of two witnesses.

WILLIAM FETZER.

Witnesses:
W. D. VORHIS,
G. SULLIVAN.